(12) United States Patent
Minckler et al.

(10) Patent No.: US 9,372,789 B2
(45) Date of Patent: *Jun. 21, 2016

(54) LOG-STRUCTURED FILED SYSTEM WITH FILE BRANCHING

(71) Applicant: SolidFire, Inc., Boulder, CO (US)

(72) Inventors: Bill Minckler, Broomfield, CO (US); David D. Wright, Boulder, CO (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/292,089

(22) Filed: May 30, 2014

(65) Prior Publication Data

US 2015/0347288 A1    Dec. 3, 2015

(51) Int. Cl.
| | |
|---|---|
| *G06F 11/00* | (2006.01) |
| *G06F 12/02* | (2006.01) |
| *G06F 3/06* | (2006.01) |
| *G06F 17/30* | (2006.01) |

(52) U.S. Cl.
CPC .......... *G06F 12/0238* (2013.01); *G06F 3/0626* (2013.01); *G06F 3/0643* (2013.01); *G06F 3/0679* (2013.01); *G06F 17/30091* (2013.01); *G06F 17/30185* (2013.01); *G06F 2212/1056* (2013.01); *G06F 2212/202* (2013.01); *G06F 2212/214* (2013.01)

(58) Field of Classification Search
CPC .................................................. G06F 11/1435
See application file for complete search history.

(56) References Cited

U.S. PATENT DOCUMENTS

| | | | |
|---|---|---|---|
| 5,403,639 A | 4/1995 | Belsan et al. | |
| 5,991,862 A * | 11/1999 | Ruane ........................... | 711/202 |
| 6,257,756 B1 * | 7/2001 | Zarubinsky et al. .......... | 714/795 |
| 6,604,155 B1 | 8/2003 | Chong, Jr. | |
| 7,366,865 B2 * | 4/2008 | Lakshmanamurthy et al. .............................. | 711/170 |
| 7,415,653 B1 | 8/2008 | Bonwick et al. | |
| 8,250,116 B2 * | 8/2012 | Mazzagatti et al. .......... | 707/803 |
| 9,009,449 B2 * | 4/2015 | Chou et al. ..................... | 712/207 |
| 2003/0028642 A1 | 2/2003 | Agarwal et al. | |
| 2004/0107281 A1 | 6/2004 | Bose et al. | |
| 2004/0133622 A1 | 7/2004 | Clubb et al. | |
| 2010/0262812 A1 * | 10/2010 | Lopez et al. .................. | 712/228 |
| 2011/0238857 A1 | 9/2011 | Certain et al. | |

(Continued)

OTHER PUBLICATIONS

Rosenblum, Mendel et al., "The design and implementation of a log-structured file system," ACM Transactions on Computer Systems (TOCS), (Feb. 1992), vol. 10, Issue 1, pp. 26-52.

(Continued)

*Primary Examiner* — Christopher McCarthy
(74) *Attorney, Agent, or Firm* — Foley & Lardner LLP

(57) ABSTRACT

Disclosed are systems, computer-readable mediums, and methods for reading a sequence number from regions of a solid state storage device. A latest region is determined based upon the sequence numbers and a checkpoint file is read within the latest region. A request for a block of data of a first branch is received. A first block of pointers associated with the first branch from the checkpoint file is read. A first pointer from the first block of pointers and a second block of pointers pointed to by the first pointer are read. A second pointer from the second block of pointers and a third block of pointers pointed to by the second pointer are read. A third pointer from the third block of pointers and data pointed to by the third pointer are read. The block of data of the first branch is determined based upon the read data. The block of data is returned.

20 Claims, 3 Drawing Sheets

(56) References Cited

U.S. PATENT DOCUMENTS

| | | |
|---|---|---|
| 2011/0283048 A1 | 11/2011 | Feldman et al. |
| 2012/0124282 A1 | 5/2012 | Frank et al. |
| 2012/0303876 A1 | 11/2012 | Benhase et al. |
| 2012/0317353 A1 | 12/2012 | Webman et al. |
| 2012/0317395 A1 | 12/2012 | Segev et al. |
| 2013/0124776 A1 | 5/2013 | Hallak et al. |
| 2013/0173955 A1 | 7/2013 | Hallak et al. |
| 2013/0305002 A1 | 11/2013 | Hallak et al. |
| 2013/0332688 A1 | 12/2013 | Corbett et al. |
| 2014/0052764 A1 | 2/2014 | Michael et al. |
| 2014/0082273 A1 | 3/2014 | Segev |

OTHER PUBLICATIONS

Arpaci-Dusseau, Remzi et al., "Log-structured File Systems," *Operating Systems: Three Easy Pieces* published by Arpaci-Dusseau Books, published May 25, 2014, Chapter 43 (15 pages).

Non-Final Office Action received for U.S. Appl. No. 14/684,942 mailed Jul. 31, 2015, 6 pages.

International Search Report and Written Opinion received for Application No. PCT/US15/21285 mailed Jun. 23, 2015, 8 pages.

* cited by examiner

LOG-STRUCTURED FILED SYSTEM WITH FILE BRANCHING

BACKGROUND

The following description is provided to assist the understanding of the reader. None of the information provided is admitted to be prior art.

Log-structured file systems were created to reduce the disk access times of input/output (I/O) operations. To reduce disk access times, data writes are done sequentially. Data writes can also be queued together, such that multiple data blocks are written sequentially during a single write. As data is written sequentially, overwriting existing data results in both the new data and the old data being stored. To reclaim additional storage space, unused data blocks can be reclaimed through garbage collection.

Based upon the design of a log-structured file system, data contents of a file can be spread across the entire storage. To be able to access a file's data content, a map can be stored at a known, fixed location. This map can include a mapping of where a file's data content resides on the storage. Accordingly, when a file is accessed this map is consulted to determine where to retrieve the file's data contents. Because the map's location is fixed, the map can be accessed by simply reading the storage at the known, fixed location of the map.

BRIEF DESCRIPTION OF THE DRAWINGS

The foregoing and other features of the present disclosure will become more fully apparent from the following description and appended claims, taken in conjunction with the accompanying drawings.

DETAILED DESCRIPTION

Overview

In general, one innovative aspect of the subject matter described below can be embodied in methods for reading, using one or more electronic processors, a sequence number from a plurality of regions of a solid state storage device, wherein the solid state storage device is divided into regions. A latest region is determined based upon the read sequence numbers. A checkpoint file within the latest region is read, and a request for a block of data of a first branch is received. A first block of pointers on the solid state storage devices associated with the first branch from the checkpoint file is read. The checkpoint file contains an association between the first branch and the first block of pointers. A first pointer from the first block of pointers is read, and a second block of pointers on the solid state storage device pointed to by the first pointer is read. A second pointer is read from the second block of pointers. A third block of pointers is read on the solid state storage device pointed to by the second pointer. A third pointer from the third block of pointers is read and data on the solid state storage device pointed to by the third pointer is read. The block of data of the first branch is determined based upon the read data pointed to by the third pointer. The block of data of the first branch is returned in response to receiving the request for the block of data of the first branch. Other implementations of this aspect include corresponding systems, apparatuses, and computer-readable media, configured to perform the actions of the method.

The foregoing summary is illustrative only and is not intended to be in any way limiting. In addition to the illustrative aspects, implementations, and features described above, further aspects, implementations, and features will become apparent by reference to the following drawings and the detailed description.

DETAILED DESCRIPTION

Described herein are techniques for a log structured file system that includes truly sequential writing without the need for any fixed data areas. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Figure 1:
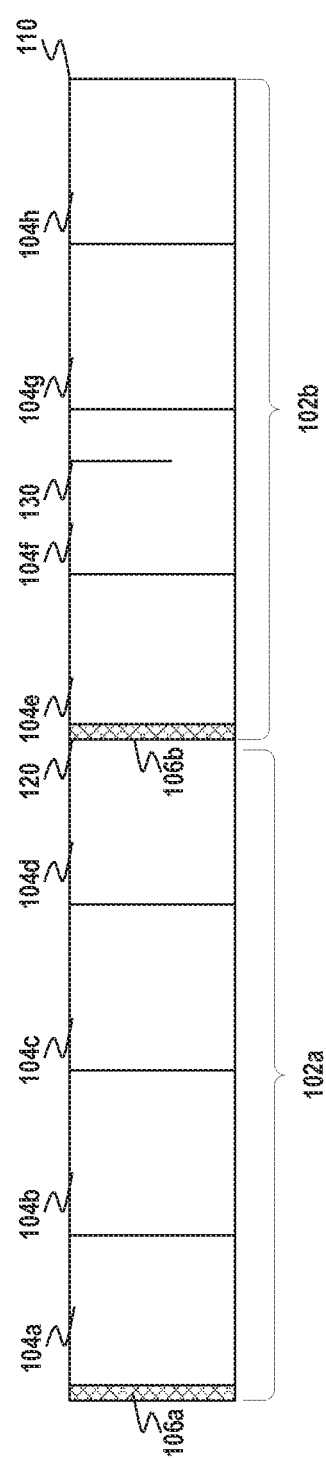
FIG. 1 depicts storage used in a log-structured file system in accordance with an illustrative implementation.

FIG. 1 depicts storage 110 used in a log-structured file system in accordance with an illustrative implementation. In one implementation, the storage 110 is a single solid state drive. The storage 110 is broken down into multiple regions or segment files, 102a and 102b. The size of the regions can be identical for a single storage. The number of regions, however, can be configured when the storage is initially configured. For example, 1 terabyte (TB) storage can include ten 102.4 gigabyte regions. Alternatively, the same 1 TB storage could be broken into forty 250 megabyte regions.

Each region is further divided into segments, 104a-104h. Data is written into the appropriate segment when data is flushed to storage. To determine where to write data, a write pointer 130 is used. The write pointer points to the next position of the storage 110 that will be written to. A corresponding read pointer 120 is also used. The read pointer points to the where the data starts in the storage 110. Because data is written in a sequential manner consecutively through the storage 110, the start of the stored data can be anywhere within the storage. Both the read pointer and the write pointer are used during garbage collection or recycling that recaptures storage space of deleted data.

Each region includes both a checkpoint, 106a and 106b, and a header (not shown). The header can include a sequence number that can be used to determine the last segment file that the file system wrote data. As described in greater detail below, this is used during start up to determine where to begin writing into storage. The checkpoint has a list of user files and metadata associated with the user files. Metadata for example can include data such as the filename, created time, last accessed time, last written time, size, etc. In addition, each file has a list of branches. Initially, a file has only a single branch. As the file is manipulated, one or more branches can be created.

To decrease write amplification, e.g., the actual amount of data written when data is written, a pointer structure can be used to identify the data contents of the file. Write amplification can be an issue when a system must write data, such as metadata, in addition to the actual data being written. For example, if 4 kilobytes (KB) of data is to be written, but to do so the file system requires 8 KB of metadata to be written, each write costs 3× the amount of data being written. Any file system has some overhead as some metadata must be written to keep track of the file contents and related data.

Figure 2:
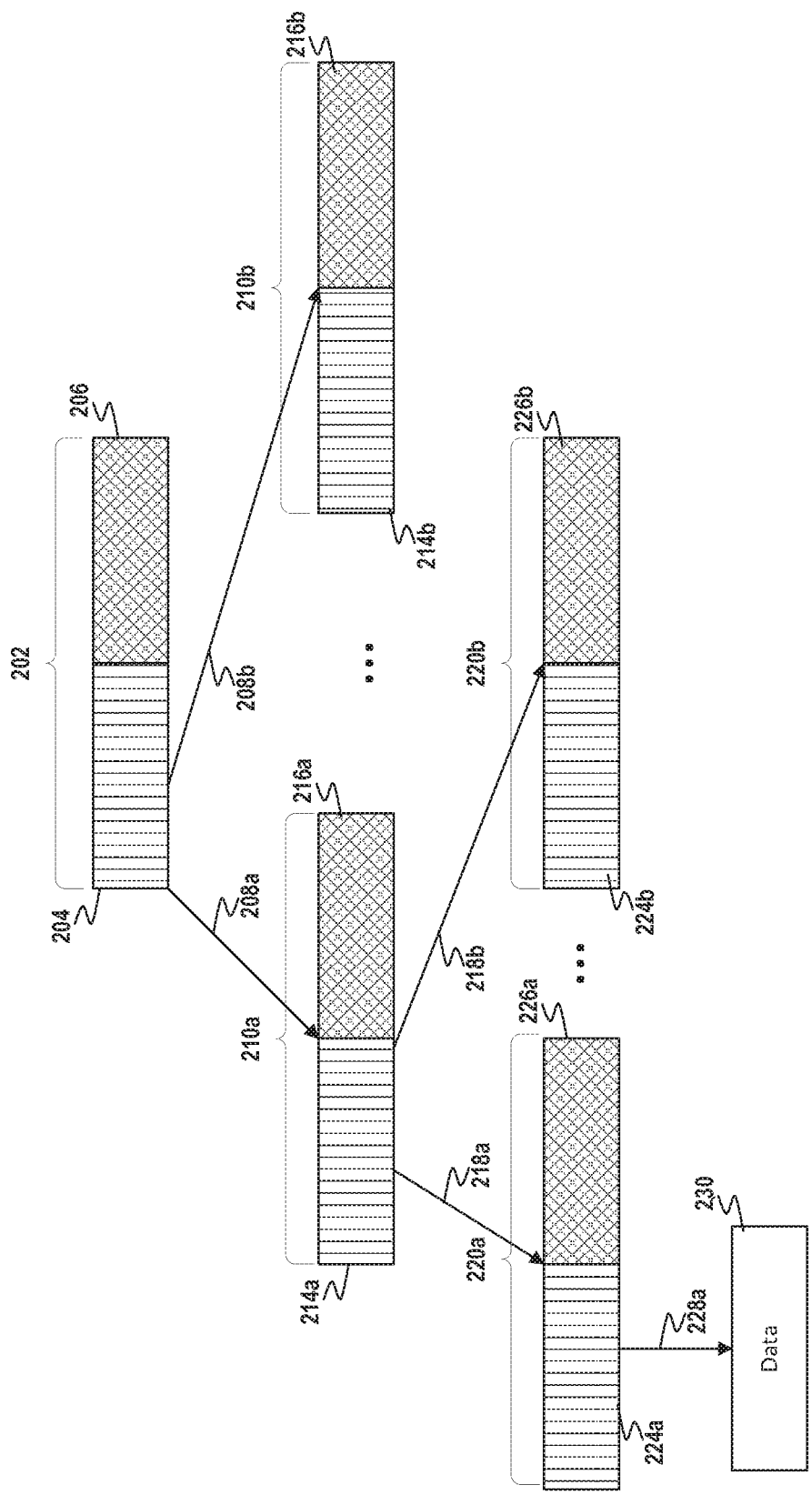
FIG. 2 depicts a representation of data contents of a file in combination with verification information in accordance with an illustrative implementation.

FIG. 2 depicts a representation of data contents of a file in combination with verification information in accordance with an illustrative implementation. In the checkpoint, each branch of a file points to first block of pointers 202. The first block of pointers 202 includes two components, a list of pointers 204 and a list of checksums 206. To increase the possible file size, each pointer of the list of pointers 204 points to another pointer block 210a or 210b. Accordingly, the number of pointers in the first pointer block 204 determines how many second blocks of pointers are needed.

The list of checksums 206 includes a checksum based on the second block of pointers pointed to by the corresponding pointer. For example, each pointer of the list of pointers 204 has a corresponding checksum. This checksum is generated based upon data within the second block of pointers 210a. For example, a checksum that corresponds with pointer 208b can be generated as a checksum of the checksums 216b. The checksums 206 can be used to efficiently compare two different files without having to access the file's data content or determine where the file's data content is actually stored. For example, two blocks of pointers can be compared to one another by determining if their checksum portions match. If they match, then the two blocks of pointers point to the same data. When the two blocks of pointers are the first block of pointers of two files, a match means that the two files contain the same data.

The structure of the second block of pointers 210a and 210b is the same as the first block of pointers 202. Accordingly, the list of pointers 214a and 214b can point to third block pointers 220a and 220b. In addition, the second block of pointers 210a and 210b include corresponding lists of checksums 216a and 216b. The checksums in the lists of checksums 216a and 216b are generate in a similar manner as described above in regard to the list of checkums 206.

The structure of the third block of pointers is the same as the first and second block of pointers. In various implementations, the third level is the last level and the third block of pointers point to data 230 rather to another block of pointers. The checksum that corresponds with a pointer can be a checksum of the data 230. In other implementations, a fourth or fifth level of block pointers can be the last level that points to data rather than to another block of pointers. In one implementation, the data pointed to by every pointer in the system is to a 4 KB block of data. The data pointed to by a pointer, e.g., a pointer 228a, can store data that is arbitrary. For example, the data can be the actual file contents. In another implementation, the data can be a block identifier that is used to look up the file content associated with that block identifier. For example, in a distributed storage system, the file content of a single file can be spread over a number of block servers. The block identifier can be used to determine which block server stores the corresponding data. Once the block server is determined, the data associated with the block identifier can be retrieved.

As noted above, each block of pointers contains a number of pointers and a corresponding number of checksums. Accordingly, for any block of pointers, the number of pointers will be the same as the number of checksums. The actual number of pointers or checksums per block, however, can change. For example, the first block of pointers 202 could have 150 pointers and checksums, while the block of pointers 210a, 210b, 220a, and 220b, each has 300 pointers and checksums. As another example, the block of pointers 220a and 220b could have 500 pointers and checksums. Accordingly, the actual number of pointers and checksum per level of block of pointers is not dependent upon any other layer of blocks.

One advantage of the implementations with three layers of blocks of pointers is that the various blocks of pointers can be cached. Caching the three layers allows data to be written to disk without having to write the blocks of pointers directly to disk. Instead, a cache containing the current state of files on the file system, e.g., the current blocks of pointers, can be updated. The flushing of the cache can occur at a later time as part of a shutdown routine, a recycling routine, or when the file system moves to a new segment. Regardless of when the cache is flushed, without having to write the current blocks of pointers to disk every time data is written reduces write amplification.

As described above, the checksum portions of the various blocks of pointers can be used to compare files. In one implementation, the checksums can be a Merkle tree. Because every file stored in the file system has a root or top level block of pointers, two files can be easily compared. For example, the top level checksums can be compared to one another. If the checksums all match, then the two files are identical. In addition, any two corresponding checksums that match mean that those portions of those two files are the same. For example, if the top level block of pointers contains 146 checksums and had the first check sum different, but the other 145 checksums were identical, only the first pointer would need to be further examined to determine how the two files differ from one another.

Because the log structured file system writes data continuously to the storage, when the file system is started, the location of the next write must be determined. In traditional log structured file systems, this was accomplished using a special location of the storage that contained metadata, such as the write pointer, etc. Using such a fixed location results in the fixed location being read and written to more than other portions of storage.

The life of solid state storage can be measured by the number of writes to any one portion of the storage before failure is likely to occur. Accordingly, having a single fixed location that is written to more frequently than other portions of the solid state storage can reduce the lifetime of the solid state storage. To avoid this negative effect, various implementations do not rely upon any single fixed location. Rather, data is written continuously from beginning of the storage to the end. Once the end of the storage is reached, the file system returns to the beginning of the storage and begins writing. The lack of a fixed location that contains file system data is beneficial in extending the life of the solid state storage, but complicates the startup procedure since the file system must search the storage to determine the write pointer.

Upon startup, the file system begins by looking at the header of each segment file or region. Each region has an increasing sequence number. By searching the sequence numbers of the regions, the region with the greatest sequence number was the latest region written to. This latest region includes the latest copy of the checkpoint file. Once the latest region is found, the checkpoint for that region can be used as the state of the file system. This state, however, may not be the complete state. That is, data may have been modified, written or deleted in the latest region. These modifications, writes, or deletes will be part of the latest region. In one implementation, the data in a region consists of three parts: a header, data, and metadata. The header provides an indication of which segment was written and can also include a checksum of that segment. The data is the modified data. The metadata provides an indication of what the modified data is. For example, metadata can include an indication that the data is user data, can be file system data, e.g., pointer data or checksum data of a block of pointers. Going through this data allows the file system state to be updated accordingly. A stopping criteria, such as a null data can indicate that there is no further usable data in the region. This becomes the write pointer for the region. Accordingly, the above process is used to determine the write pointer of the log structured file system upon starting up.

Figure 3A:
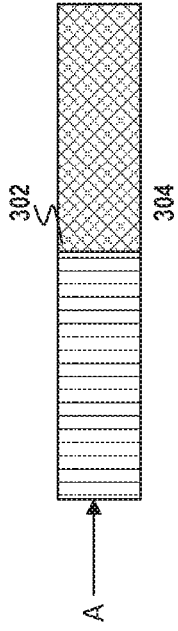
FIGS. 3A-3E depict a representation of branches of a file in accordance with an illustrative implementation.
Figure 3B:
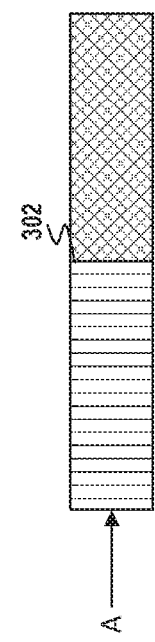

As described above, each region includes a checkpoint. The checkpoint includes a list of all files that are stored on the file system. In various implementations, the log structured file system allows copies or branches of a file to be made. These branches are fully accessible as any other file. For example, data can be written to a branch and a new branch can be created from a branch of a file. Accordingly, for each file in the file system, there is a list of branches for that file. A file that is first created, i.e., it does not have any branches, can be thought of as having a single branch. For each branch, there is a pointer to a top-level block of pointers. This top-level block of pointers identifies the file's data content. FIGS. 3A-3E depict a representation of branches of a file in accordance with an illustrative implementation. In FIG. 3A, the file system contains a file referred to as A. There are no branches associated with file A. The data contents of A can be retrieved using the block of pointers 302 that is pointed to by A. The block of pointers 302 is the top-level block of pointers that can point to other blocks of pointers. For example, the block of pointers 302 can correspond with the block of pointers 202 described with respect to FIG. 2. The file system can create a branch of file A, by creating a new entry in the list of A's branches in the checkpoint file. FIG. 3B illustrates a new file referred to as A'. Initially, both A and A' point to the same block of pointers 302. Accordingly, these two files contain the same data in all levels of the block of pointers, including the eventual data. In another implementation, the top-level block of pointers can always be copied to create two separate two-level block of pointers, one for each file A and A'. The lower level block of pointers, however, would initially be shared.

Figure 3C:
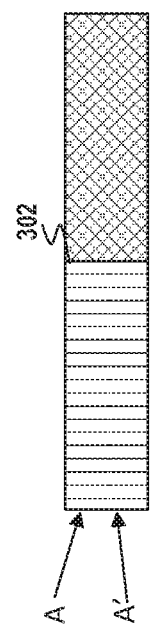

Data can be written to either A or A' independently of one another. When this occurs, A and A' can no longer point to the same exact block of pointers, since they would have different data. The file system can determine if a new top-level block of pointers needs to be created when writing data based upon a shared or private indication. In one implementation, the shared and private indication is associated with the logical index of data in a file. Here, the logical index of data in a file refers to the index into a file that the user is writing into. For example, a file system that writes 1 KB data blocks and where a user has a 10 KB file, the logical index would be one of 0 KB, 1 KB, 2 KB, . . . 8 KB, or 9 KB. For each file, each logical index is indicated as being shared with all branches or private to each branch. When data is written to a particular branch, the corresponding private/shared bit can be referenced. If the bit is set to private, the write can occur normally. If the bit, however, is shared, the data for the other branches must not be changed. This can be accomplished by creating a copy, which can be cached, for each branch of any block of pointers that will change based upon writing the data to the selected branch. Once the copying is complete, the data can be written normally to the selected branch. In addition, once the writing of data is complete the private/shared bit can be updated to indicate that this logical index is private to each branch. FIG. 3C shows the top-level block of pointers after data has been modified in either A or A'. Because these files no longer contain the same data, the files A and A' point to different top-level block of pointers.

Figure 3D:
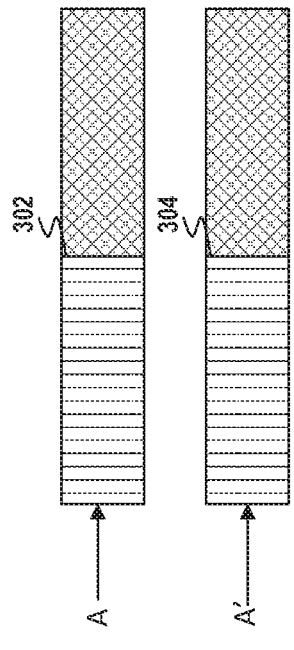
Figure 3E:
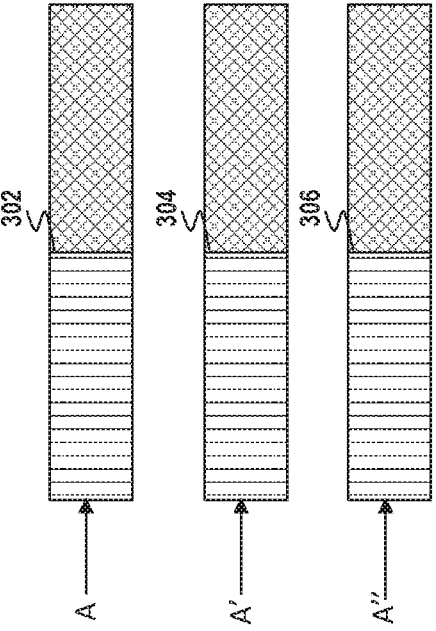

FIG. 3D depicts creating a new branch, A'', based upon A'. Similar to FIG. 3B, because A' and A'' contain the same data, they point to the same top-level block of pointers. Once data has been modified in either A' or A'', the top-level block of pointers are no longer the same, as seen in FIG. 3E. While FIGS. 3A-3E, show that the top-level block of pointers changes once data has been modified, a majority of the lower level block of pointers can still be shared between the branches in the file system. Accordingly, creating branches and modifying branches never requires a complete copy of any file at a single point in time. In addition, there are no artificial limits placed on branches. In various implementations, branches can be used interchangeably with the term file. That is, a file and a branch share the same structure within the file system. Accordingly, any action that can be done to a file can also be done to a branch. This allows any number of branches off of branches, and allows branches to be read, written, and modified as another file in the file system.

In one implementation, a file or branch can be used to store data about the files that are contained on a user's volume. A volume is a unit of storage that can be used by a user to store one or more files. Accordingly, branches can be made of an entire volume, rather than individual files. In addition, branches can be used in various other ways. For example, a branch of a volume can be used to create a brand new volume within the file system. This can used to create a backup volume a working volume before a large amount of data is changed. If any issues are noticed, the backup volume can be used. In addition, a branch of a volume can be used to create a branch on another volume. This can be useful if there is a standard volume of data, e.g., a standard installation of programs. A new user volume can be created from the branch corresponding to the standing volume. As the user changes the volume's data, e.g., by installing new programs or upgrading programs, a user may notice that certain issues arise. For example, after updating a program, other programs may break or the new version may have undesired issues. The cause of these issues, however, may not be simple to ascertain. The standard volume can be created as a new branch from the user's current volume. The user can use the standard volume to determine if the issues have been resolved. If the issues have been resolved, the issues are likely to be a result of the changes made by the user. If the issues still occur with the standard volume, the issues are likely to be caused by the applications on the standard volume.

As described above, the described log structured file system writes data continuously from the beginning of a storage to the end of the storage. As data is deleted, an indication that the data has been deleted is written, but the actual data remains on the disk. Eventually, this deleted data must be recaptured so that additional data can be written to storage. This is accomplished with a process referred to as garbage collection or recycling. The file system maintains two pointers that are utilized in recycling, a read pointer 120 and a write pointer 130. These are shown in FIG. 1. The data starting at the write pointer 130 up to the read pointer 120 is the amount of space available for writing new data. In other words, a storage of some capacity, e.g., 100 GB, can store up to that amount of storage. The data that is pointed to by some file on the file system is between the read pointer and the write pointer. Any data that is written after the write pointer and before the read pointer is not useful. Either that data has been removed or that data has been rewritten to another part of the storage that is between the read pointer and the write pointer. In another implementation, one or more regions are reserved for garbage collection. This ensures that at least one region is available for garbage collection. To enforce this, once the space between the write pointer 130 and the read pointer 120 is determined to be within a certain distance, e.g., one or more regions, writes of new data to the storage device are no longer allowed. Deletions and modifications, however, are still allowed. Once enough data has been deleted such that there is sufficient distance between the write pointer 130 and the read pointer 120 writes are re-enabled.

Recycling can be accomplished by starting at the read pointer and analyzing each block of data. The segment data, e.g., the header, data, and metadata, can be used to analyze the data. Any data that has been deleted does not need to be copied. Any data that has been modified or added to the file system needs to be copied at the location pointed to by the write pointer. Once the read pointer reaches the position of the write pointer at the start of recycling, recycling can stop. Recycling can occur at various times. For example, recycling can be done each time a segment is written, each time a new region is written to, or based upon the distance between the read pointer and the write pointer.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system comprising:
   one or more electronic processors configured to:
   read a sequence number from a plurality of regions of a solid state storage device, wherein the solid state storage device is divided into regions;
   determine a latest region based upon the read sequence numbers;
   read a checkpoint file within the latest region;
   receive a request for a block of data of a first branch;
   read a first block of pointers on the solid state storage devices associated with the first branch from the checkpoint file, wherein the checkpoint file contains an association between the first branch and the first block of pointers;
   read a first pointer from the first block of pointers;
   read a second block of pointers on the solid state storage device pointed to by the first pointer;
   read a second pointer from the second block of pointers;
   read a third block of pointers on the solid state storage device pointed to by the second pointer;
   read a third pointer from the third block of pointers;
   read data on the solid state storage device pointed to by the third pointer;

determine the block of data of the first branch based upon the read data pointed to by the third pointer; and
return the block of data of the first branch in response to receiving the request for the block of data of the first branch.

2. The system of claim 1, wherein the read data pointed to by the third pointer is the block of data of the first branch.

3. The system of claim 1, wherein the one or more electronic processors are further configured to:
send the data pointed to by the third pointer to a block server, wherein the data pointed to by the third pointer is a block identifier; and
receive a block of data associated with the block identifier from the block server, wherein the block of data associated with the block identifier is the block of data of the first branch.

4. The system of claim 1, wherein the first block of pointers further comprises a checksum based upon the second block of pointers, wherein the second block of pointers further comprises a checksum based upon the third block of pointers, and wherein the third block of pointers comprises a checksum based upon the data pointed to by the third pointer.

5. The system of claim 4, wherein the first block of pointers comprises a plurality of pointers to a plurality of blocks of pointers, including the second block of pointers, and wherein the first block of pointers comprises a checksum for each of the plurality of blocks of pointers, including the checksum based upon the second block of pointers.

6. The system of claim 5, wherein the checksum based upon the second block of pointers is a checksum of a plurality of checksums of the second block of pointers, wherein the plurality of checkums of the second block of pointers includes the checksum based upon the third block of pointers.

7. The system of claim 5, wherein a merkle tree comprises the checksums of the first block of pointers, the second block of pointers, and third block pointers.

8. The system of claim 1, wherein the one or more electronic processors are further configured to:
receive a request to create a second branch from the first branch; and
create a second branch entry in the checkpoint file that points to the first block of pointers, wherein the first block of pointers, the second block of pointers, and third block of pointers are shared between the second branch and the first branch.

9. The system of claim 1, wherein the one or more electronic processors are further configured to create a new volume based upon the first branch, wherein the first branch comprises all files within an original volume of data.

10. The system of claim 1, wherein the one or more electronic processors are further configured to create a branch of an existing volume based upon the first branch, wherein the first branch comprises all files within an original volume of data, and wherein the original volume is different than the existing volume.

11. The system of claim 1, further comprising cache memory configured to store the first block of pointers, the second block of pointers, and the third block of pointers.

12. The system of claim 11, wherein the one or more processors are further configured to:
receive a request to write a block of data to the first branch;
write the block of data to the solid state storage; and
update the first block of pointers, the second block of pointers, and the third block of pointers in cache memory to reduce write amplification.

13. A method comprising:
reading, using one or more electronic processors, a sequence number from a plurality of regions of a solid state storage device, wherein the solid state storage device is divided into regions;
determining, using the one or more electronic processors, a latest region based upon the read sequence numbers;
reading, using the one or more electronic processors, a checkpoint file within the latest region;
receiving a request for a block of data of a first branch;
reading a first block of pointers on the solid state storage devices associated with the first branch from the checkpoint file, wherein the checkpoint file contains an association between the first branch and the first block of pointers;
reading a first pointer from the first block of pointers;
reading a second block of pointers on the solid state storage device pointed to by the first pointer;
reading a second pointer from the second block of pointers;
reading a third block of pointers on the solid state storage device pointed to by the second pointer;
reading a third pointer from the third block of pointers;
reading data on the solid state storage device pointed to by the third pointer;
determining, using the one or more electronic processors, the block of data of the first branch based upon the read data pointed to by the third pointer; and
returning the block of data of the first branch in response to receiving the request for the block of data of the first branch.

14. The method of claim 13, wherein the first block of pointers further comprises a checksum based upon the second block of pointers, wherein the second block of pointers further comprises a checksum based upon the third block of pointers, and wherein the third block of pointers comprises a checksum based upon the data pointed to by the third pointer.

15. The method of claim 14, wherein the first block of pointers comprises a plurality of pointers to a plurality of blocks of pointers, including the second block of pointers, and wherein the first block of pointers comprises a checksum for each of the plurality of blocks of pointers, including the checksum based upon the second block of pointers.

16. The method of claim 13, further comprising:
receiving a request to create a second branch from the first branch; and
creating a second branch entry in the checkpoint file that points to the first block of pointers, wherein the first block of pointers, the second block of pointers, and third block of pointers are shared between the second branch and the first branch.

17. A non-transitory computer-readable medium having instructions stored thereon, the instructions comprising:
instructions to read a sequence number from a plurality of regions of a solid state storage device, wherein the solid state storage device is divided into regions;
instructions to determine a latest region based upon the read sequence numbers;
instructions to read a checkpoint file within the latest region;
instructions to receive a request for a block of data of a first branch;
instructions to read a first block of pointers on the solid state storage devices associated with the first branch from the checkpoint file, wherein the checkpoint file contains an association between the first branch and the first block of pointers;

instructions to read a first pointer from the first block of pointers;

instructions to read a second block of pointers on the solid state storage device pointed to by the first pointer;

instructions to read a second pointer from the second block of pointers;

instructions to read a third block of pointers on the solid state storage device pointed to by the second pointer;

instructions to read a third pointer from the third block of pointers;

instructions to read data on the solid state storage device pointed to by the third pointer;

instructions to determine the block of data of the first branch based upon the read data pointed to by the third pointer; and instructions to return the block of data of the first branch in response to receiving the request for the block of data of the first branch.

18. The non-transitory computer-readable medium of claim 17, wherein the first block of pointers further comprises a checksum based upon the second block of pointers, wherein the second block of pointers further comprises a checksum based upon the third block of pointers, and wherein the third block of pointers comprises a checksum based upon the data pointed to by the third pointer.

19. The non-transitory computer-readable medium of claim 18, wherein the instructions further comprise:

instructions to receive a request to create a second branch from the first branch; and instructions to create a second branch entry in the checkpoint file that points to the first block of pointers, wherein the first block of pointers, the second block of pointers, and third block of pointers are shared between the second branch and the first branch.

20. The non-transitory computer-readable medium of claim 17, wherein the first block of pointers further comprises a checksum based upon the second block of pointers, wherein the second block of pointers further comprises a checksum based upon the third block of pointers, and wherein the third block of pointers comprises a checksum based upon the data pointed to by the third pointer.

* * * * *